(12) United States Patent
Reddy et al.

(10) Patent No.: US 10,223,636 B2
(45) Date of Patent: Mar. 5, 2019

(54) ARTIFICIAL INTELLIGENCE SCRIPT TOOL

(75) Inventors: Martin Reddy, San Francisco, CA (US); Oren M. Jacob, Piedmont, CA (US); Robert G. Podesta, Oakland, CA (US); Lucas R. A. Ives, Menlo Park, CA (US); Kathleen Hale, San Francisco, CA (US)

(73) Assignee: PULLSTRING, INC., San Francisco, CA (US)

( * ) Notice: Subject to any disclaimer, the term of this patent is extended or adjusted under 35 U.S.C. 154(b) by 477 days.

(21) Appl. No.: 13/558,206

(22) Filed: Jul. 25, 2012

(65) Prior Publication Data

US 2014/0032471 A1    Jan. 30, 2014

(51) Int. Cl.
*G06N 3/00*    (2006.01)
*G06N 5/02*    (2006.01)
*G10L 15/22*    (2006.01)

(52) U.S. Cl.
CPC .............. *G06N 5/02* (2013.01); *G06N 3/004* (2013.01); *G10L 15/22* (2013.01)

(58) Field of Classification Search
None
See application file for complete search history.

(56) References Cited

U.S. PATENT DOCUMENTS 6,754,647 B1    6/2004   Tackett et al.
6,959,166 B1    10/2005  Gabai et al.
(Continued)

FOREIGN PATENT DOCUMENTS

CN    101194289 A    6/2008
CN    101656799 A    2/2010
(Continued)

OTHER PUBLICATIONS

Ian Eslick, "ScratchTalk and Social Computation: Towards a natural language scripting model", "http://ceur-ws.org/Vol-323/paper01.pdf", CEUR Workshop Proceedings (CEUR-WS.org) Online Proceedings for Scientific Workshops, vol. 323, 2008, pp. 1-8.*

(Continued)

*Primary Examiner* — Christian Chace
*Assistant Examiner* — Daniel T Pellett
(74) *Attorney, Agent, or Firm* — Perkins Coie LLP

(57) ABSTRACT

Systems and methods to create content for interactive synthetic characters are provided. In some embodiments, a conversation editor may be configured to create a traversable script for an interactive synthetic character by receiving conversation rules from a user. These rules can be used to match words or phrases that a user speaks or types, or to monitor for a physical movement of the user or synthetic character. Each rule can include responses to be performed by the interactive synthetic character. Examples of responses include producing audible or textual speech for the synthetic character, performing animations, playing sound effects, retrieving data, and the like. A traversable script can be generated from the conversation rules that when executed by the synthetic character allows for the dynamic interactions. In some embodiments, the traversable script can be navigated by a state engine using navigational directives associated with the conversation rules.

34 Claims, 14 Drawing Sheets

(56) References Cited

U.S. PATENT DOCUMENTS

| | | | |
|---|---|---|---|
| 7,103,585 B2* | 9/2006 | Jowell | G06F 17/30401 706/45 |
| 8,719,200 B2* | 5/2014 | Beilby et al. | 706/45 |
| 8,972,324 B2 | 3/2015 | Reddy et al. | |
| 2006/0069546 A1* | 3/2006 | Rosser et al. | 704/9 |
| 2006/0155765 A1* | 7/2006 | Takeuchi et al. | 707/104.1 |
| 2008/0091628 A1 | 4/2008 | Srinivasa et al. | |
| 2009/0254417 A1 | 10/2009 | Beilby et al. | |
| 2009/0275408 A1* | 11/2009 | Brown | 463/35 |
| 2009/0319619 A1 | 12/2009 | Affronti et al. | |
| 2010/0008639 A1* | 1/2010 | Greenberg | G06Q 10/06 386/248 |
| 2010/0049513 A1* | 2/2010 | Huang | G10L 15/22 704/231 |
| 2011/0091021 A1 | 4/2011 | Adkar et al. | |
| 2011/0099130 A1 | 4/2011 | Blumberg et al. | |
| 2011/0143631 A1* | 6/2011 | Lipman | A63H 3/28 446/175 |
| 2012/0116584 A1 | 5/2012 | Kim et al. | |
| 2012/0158634 A1 | 6/2012 | Spring | |
| 2014/0032467 A1 | 1/2014 | Reddy et al. | |

FOREIGN PATENT DOCUMENTS

| | | |
|---|---|---|
| CN | 101751799 A | 6/2010 |
| CN | 102520789 A | 6/2012 |
| JP | 2006171719 A | 6/2006 |
| WO | WO-2001061541 A2 | 8/2001 |
| WO | WO-2001069799 A2 | 9/2001 |
| WO | WO-2006129967 A1 | 12/2006 |
| WO | WO-2011089450 A2 | 7/2011 |

OTHER PUBLICATIONS

Jiyou Jia, Weichao Chen, "Script-Based Design for Human-Computer Dialog in Given Scenarios for English Learners", Advanced Learning Technologies, 2008. ICALT '08. Eighth IEEE International Conference on, Jul. 1-5, 2008, pp. 739-743.*

Ana-Maria Popescu, Oren Etzioni, Henry Kautz "Towards a theory of natural language interfaces to databases", IUI '03 Proceedings of the 8th international conference on Intelligent user interfaces, 2003, pp. 149-157 pp. 149-157.*

Nancy L. Green and Boyd Davis, "Dialogue Generation in an Assistive Conversation Skills Training System for Caregivers of Persons with Alzheimer's Disease", AAAI Technical Report SS-03-66, www.aaai.org, 2003, pp. 1-8.*

Nancy Green, William Lawton, Boyd Davis, "An Assistive Conversation Skills Training System for Caregivers of Persons with Alzheimer's Disease", American Association for Artificial Intelligence (www.aaai.org), 2004, pp. 1-6.*

Timothy Bickmore, Justine Cassell, ""How about this weather?" Social Dialogue with Embodied Conversational Agents", American Association for Artificial Intelligence (www.aaai.org), 2000, pp. 1-5.*

Markus Lockelt, "A Flexible and Reusable Framework for Dialog and Action Management in Multi-Party Discourse", phd Thesis published by zur Erlangung des Grades des Doktors der Ingenieurwissenschaften der Naturwissenschaftlich-Technischen Fakultaten der Universitat des Saarlandes, 2008, pp. 1- 265.*

Co-Pending U.S. Appl. No. 13/558,239, by Reddy, M., et al., filed Jul. 25, 2012.

International Search Report and Written Opinion for International Application No. PCT/2013/052128 dated Dec. 17, 2013, 13 pages.

International Search Report and Written Opinion for International Application No. PCT/2013/052135 dated Nov. 16, 2013, 11 pages.

Non-Final Office Action dated Jun. 11, 2014, in Co/pending U.S. Appl. No. 13/558,206 by Reddy, M., et al. filed Jul. 25, 2012.

Glas et al., "An Interaction Design Framework for Social RobotsA", RSS, pp. 1-8; Los Angeles, CA, Jun. 2011.

Notice of Allowance dated Dec. 24, 2014, U.S. Appl. No. 13/558,239, by Reddy, M., et al., filed Jul. 25, 2012.

First Office Action corresponding to Chinese Application No. 201380039543.8 dated Jan. 4, 2017, 21 Pages.

* cited by examiner

FIG. 7

| Conversation | Age | Repeat |
|---|---|---|
| Q Do you ~like ~meat? | | |
| 🧸 You've already asked me that | | Yes |
| 🎵 Wah-wah | | |
| 🧸 Oooh, yes, yummy yummy | < 5 | |
| 🧸 I love all meat | | |
| 🧸 My favorite meat is chicken. What's your favorite? | | |
| Q Chicken | | |
| 🧸 Hey, we like the same thing! | | |
| Q Pork | | |
| 🧸 Ah, the other white meat. | | |
| Q <fallback> | | |
| 🧸 Cool. I like that too | | |
| 🧸 Actually, I'm vegetarian | | |
| Q ~like ~fish? | | |
| 🧸 Yes, I love fish. | | |
| 🧸 Yeah, my favorite is tilapia | | |
| Q Why vegetarian? | | |
| 🧸 Just because | | |

~like = like, love, enjoy
~meat = chicken, pork, beef, meat
~fish = fish, salmon, trout

FIG. 9A

| Conversation | Personality | Age | Repeat |
|---|---|---|---|
| 👋 Shake Gesture | | | |
| 🧸 Oooh, I'm all dizzy now | | | |
| 〰️ Dizzy Animation | | | |
| 🧸 Man, you really like to shake me! | | | Yes |
| 🧸 Okay, maybe that's enough for now | | | Yes |
| 🧸 Again! Again! | | < 7 | |
| 🧸 Hey, stop doing that! | Obnoxious | | Yes |

FIG. 9B

○ ○ ○           Record List

Session Name: | 120706

Categories with Approved Lines:

> Food
> Goodnight
> Knock Knock Jokes
> Confrontations
> Goodbye, returning
> Ellington
> Playtime
> Countries
> Home
> So Many Feelings
> Numbers
> Our Changing World
> Failed to Understand 2
> Failed to Understand
> Interjections Lines to Record: 53

[ Cancel ]        [ Upload To Server ]

FIG. 11B

ARTIFICIAL INTELLIGENCE SCRIPT TOOL

TECHNICAL FIELD

Various embodiments of the present invention generally relate to creating content for interactive synthetic characters. More specifically, various embodiments of the present invention relate to artificial intelligence (AI) script tools.

BACKGROUND

Toys have been around for thousands of years. Egyptian, Grecian, and Roman children played with toys that were made from stone, pottery, wax, wood, and other primitive materials. More recently, toys have also been made of newer materials such as plastics. These toys, however, were static and children were left to use their imagination in forming animations or personalities for the toys. Other toys have included mechanical features that allowed for simple mechanical movements or for the recitation of a word or phrase when the child pulled a string or pressed a button.

With the proliferation of computers, actuators, and processing technology, interactive toys and computer games have become more common. These toys are capable of sensing the environment, making decisions, and interacting with children. However, many of the toys only provide for a limited set of simple linear interactions. Creating more sophisticated content for these toys and games is still difficult as there are many potential inputs, each potentially requiring a different response.

Creating systems that can take these inputs and make decisions, reason, evolve, communicate, and manipulate objects is widely studied in branches of computer science and robotics. While some current toys have more interactive features, these toys still lack various personality traits found in humans. Creating a synthetic character having various personality traits is even more difficult. Traditional tools for creating scripts and content are too simplistic to allow for the efficient creation of complex interactive content. For example, common script writing tools are often linear and do not facilitate dynamic interactions. As such, there are a number of challenges and inefficiencies found in traditional tools for creating content for artificial intelligence systems such as toys and games.

SUMMARY

Systems and methods are described for creating interactive synthetic characters using an artificial intelligence scripting tool. In some embodiments, a method includes displaying a conversation editor on a display device. The conversation editor may be configured to create a traversable script for an interactive synthetic character. A set of conversation rules can be received from a user. In some embodiments, these rules can be guided by the conversation editor. The conversation rules can include multi-way communications between one or more interacting entities (e.g., other toys, children, etc.)

In accordance with various embodiments, each conversation rule can include one or more responses, which can include actions to be performed by the interactive synthetic character. The responses can include, for example, audible or written words for the synthetic character to speak, performing one or more animations, playing one or more sound effects, retrieving data from one or more data sources, and the like. In addition, in some embodiments, various categories and/or age ranges may be assigned to the conversation rules allowing different responses depending on the age of the end user.

A traversable script can be generated from the set of conversation rules. When executed by the synthetic character, the script allows for dynamic interactions that can depend on multiple variables and/or change over time. In some embodiments, the traversable script can be navigated by a state engine using one or more navigational directives associated with the conversation rules. Once created, the script can be stored in a database which can be accessed by various toys and/or programs.

Various embodiments of the present invention provide for a computer-implemented method for developing content for an interactive synthetic character. In accordance with some embodiments, a user interface screen can be displayed on a terminal (e.g., computer, mobile device, etc.). The user interface screen can include a conversation rule editor for creating a conversation. A first conversation rule to be matched with a user input (e.g., movements, speech patterns, interaction, etc.) can be received from a user and displayed on the user interface screen. In some embodiments, a second conversation rule based on the first conversation rule may be dynamically populated on the user interface screen. In other embodiments, the user may enter the second conversation rule. The editor can also allow the user to associate an age or age range, category, navigational directives, time-based rules, and/or other features for creating an interactive experience.

In some embodiments, the user interface screen can include a simulator allowing the user to navigate the conversation created through an interactive chat. This simulator may also provide capabilities that allow the user to debug the current conversation, such as visually stepping through each rule and response, placing breakpoints at certain points in the conversation, or forcing the conversation down a specific path.

Embodiments of the present invention also include computer-readable storage media containing sets of instructions to cause one or more processors to perform the methods, variations of the methods, and other operations described herein.

Various embodiments of the present invention include a system comprising a display device, an input/output device, a memory, and a processor. The processor can be in communication with the display input/output device and operable to execute instructions stored in memory. In some embodiments, the processor executable instructions can cause the processor to communicate display data to the display input/output device to cause a graphical user interface to be displayed on the display device. The graphical user interface may include an interactive script editor through which a set of customized rules and responses can be entered by a user. The interactive script editor can be used to visually indicate the relationship between the set of customized rules, each having a response to be performed by the interactive synthetic character or an environmental stimulus observed by the interactive synthetic character. Each response to be performed by the interactive synthetic character may be visually associated with a corresponding customized rule with an environmental stimulus (e.g., data inputs, environment observations, or interactions with interactive synthetic character) that triggers the response.

Some embodiments of the present invention provide for a script writing application configured to present conversation rules in a graphical user interface window. Each conversation rule can be associated with a response (e.g., producing audible or textual speech, playing a media clip, starting an animation, etc.) to be performed by the synthetic character. The graphical user interface window can include multiple visual representations of the same conversation. For example, in one representation, the conversation rules may be presented hierarchically. In another representation, a dialog simulator capable of using a state engine to navigate the conversation rules is presented. The script writing application may also include a suggestion engine configured to receive the conversation rules and present a suggestion for further conversation rules.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which:

FIG. 7 is a screenshot of an exemplary tree editor tool creating an animated dialog in accordance with some embodiments of the present invention;

FIGS. 9A and 9B are screenshots of exemplary conversation editors creating an animated dialog in accordance with some embodiments of the present invention;

FIGS. 11A and 11B are screenshots of exemplary editors for creating character metadata and managing recorded content in accordance with some embodiments of the present invention.

Figure 1:
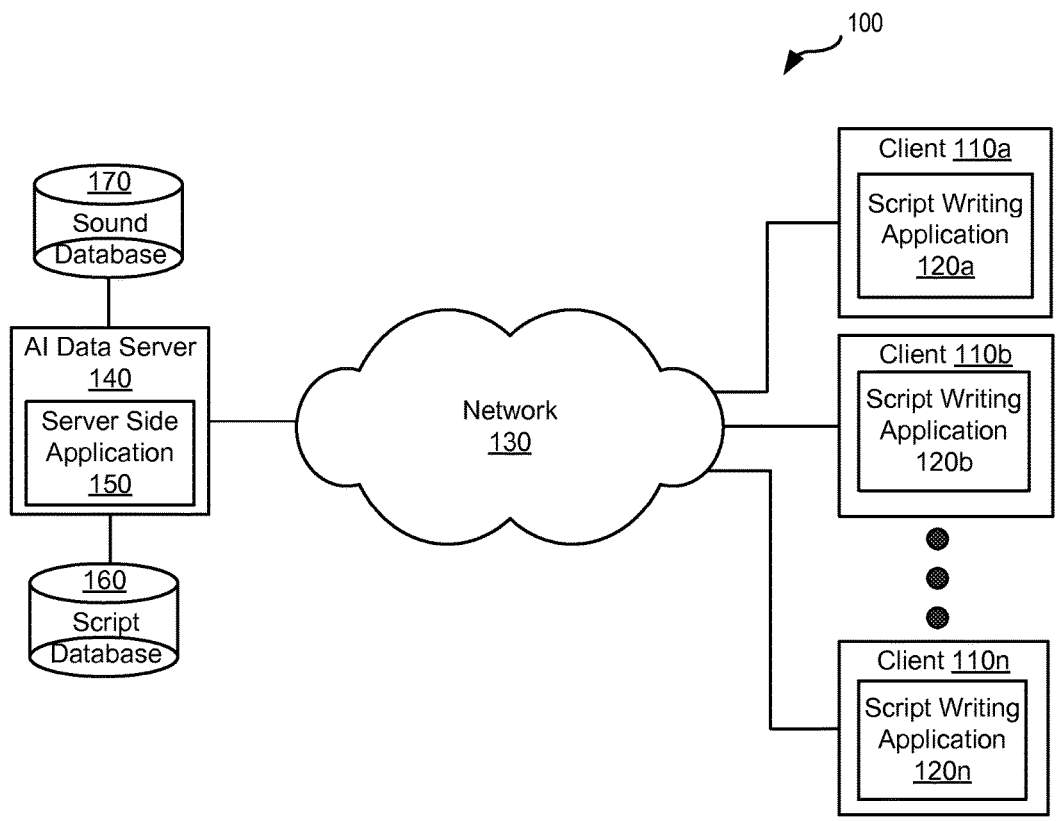
FIG. 1 illustrates an example of a computing environment for creating scripts for an interactive synthetic character in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to creating content for interactive synthetic characters. More specifically, various embodiments of the present invention relate to systems and methods for an artificial intelligence scripting tool. The scripting tool allows for the creators of content to more easily produce hierarchical interactions to effectively emulate various human traits and abilities (e.g., communication, movements, knowledge, etc.) in synthetic characters. As a result, the interactive synthetic character becomes more interesting to end users.

In accordance with some embodiments of the present invention, the scripting tool can include various editors, widgets, modules, and features to aid the user in creating the interactive content. These tools can be used for creating hierarchical scripts having different states that can be traversed depending on different conditions that are present. Various engines and models can be used to combine the available information, including uncertain and/or incomplete information, and determine how to traverse the script. For example, various deterministic and probabilistic methods (e.g., Bayesian networks, Markov Chains, and Kalman filters) may be used. In addition, neural network and fuzzy logic can be used in some embodiments.

In accordance with some embodiments, the scripting tool can include a tree editor that provides a "tree" view of a hierarchical conversation. For example, the editor can allow for multiple inputs such as the user saying "Hello, how are you?" and "hi." Depending on the input, different responses can be created. For example, in the case of "hi" a response of "hello there!" may be used. In the case of "Hello, how are you?" a more elaborate conversation can be created by asking the user how they are and then recognize various responses such as "good," "bad," or a fallback response that will match anything else (to give some kind of response in the cases when we don't understand what the user said).

In some embodiments, the scripting tool allows for key words to be selected from the phrases supplied. The AI system or character can then look for these key words in the speech of a user of the AI system or character. This allows the creative writers to write out actual phrases and then just specify the key words that are used for the pattern recognition. The remaining words in the phrases can be completely ignored or otherwise deemphasized. For example, if only the words "love" and "you" are emphasized, then the system will recognize any phrase from the user that uses those words in that order, such as "oh hi there I really love all that you are." This offers a useful technique to allow the creative user to specify pattern matching for an AI system.

Some embodiments include a script editor that can be used to edit the same underlying data using a different visual and interactive mechanism. The script editor can allow for a top-down display of dialog from the top of the screen down through each of the conversation threads. At each vertical level multiple options may be presented, i.e., the different tracks the conversation could take. One advantage of the script editor is that the editor may produce a linear looking script from top to bottom of the screen, and the dialog boxes can slide left and right to let the user choose different tracks down the hierarchical conversation. Thus presenting a more linear view through a hierarchical dataset that is more familiar to creative workers.

While, for convenience, embodiments of the present invention are described with reference to interactive synthetic characters for toys and games, embodiments of the present invention are equally applicable to various other AI systems with business, military, educational, and/or other applications. The techniques introduced here can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

FIG. 1 illustrates an example of a computing environment 100 for creating scripts for an interactive synthetic character in which some embodiments of the present invention may be utilized. The embodiments illustrated in FIG. 1 show multiple clients 110*a*-110*n* running script writing applications 120*a*-120*n* capable of creating customized content for interactive synthetic characters. Clients 110*a*-110*n* may be web browsers, applications, or systems capable of using network 130 for accessing artificial intelligence (AI) server 140. AI server 140 may be running server side application 150 which is communicably coupled to a script database 160 and a sound database 170. Server side application 150 may also be used to facilitate some or all of the processing necessary for script writing application 120*a*-120*n*. In addition, server side application 150 may host additional subscription based components to enhance the features within script writing application 120*a*-120*n*.

Script database 160 may be used to store the content created by script writing application 120*a*-120*n*. Various toys, games, or systems can retrieve the content from script database 160 via network 130. Sound database 170 stores recordings (e.g., media clips, recordings of actors reading various phrases or dialog portions, or sound effects). The content stored in script database 160 can link to one or more of these recordings or may include a copy.

Network 130 can be any group of interconnected devices capable of exchanging information. In some embodiments, network 130 may be as few as several personal computers on a Local Area Network (LAN) or as large as the Internet. In some cases, network 130 may be comprised of multiple networks (private and/or public), even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Figure 2:
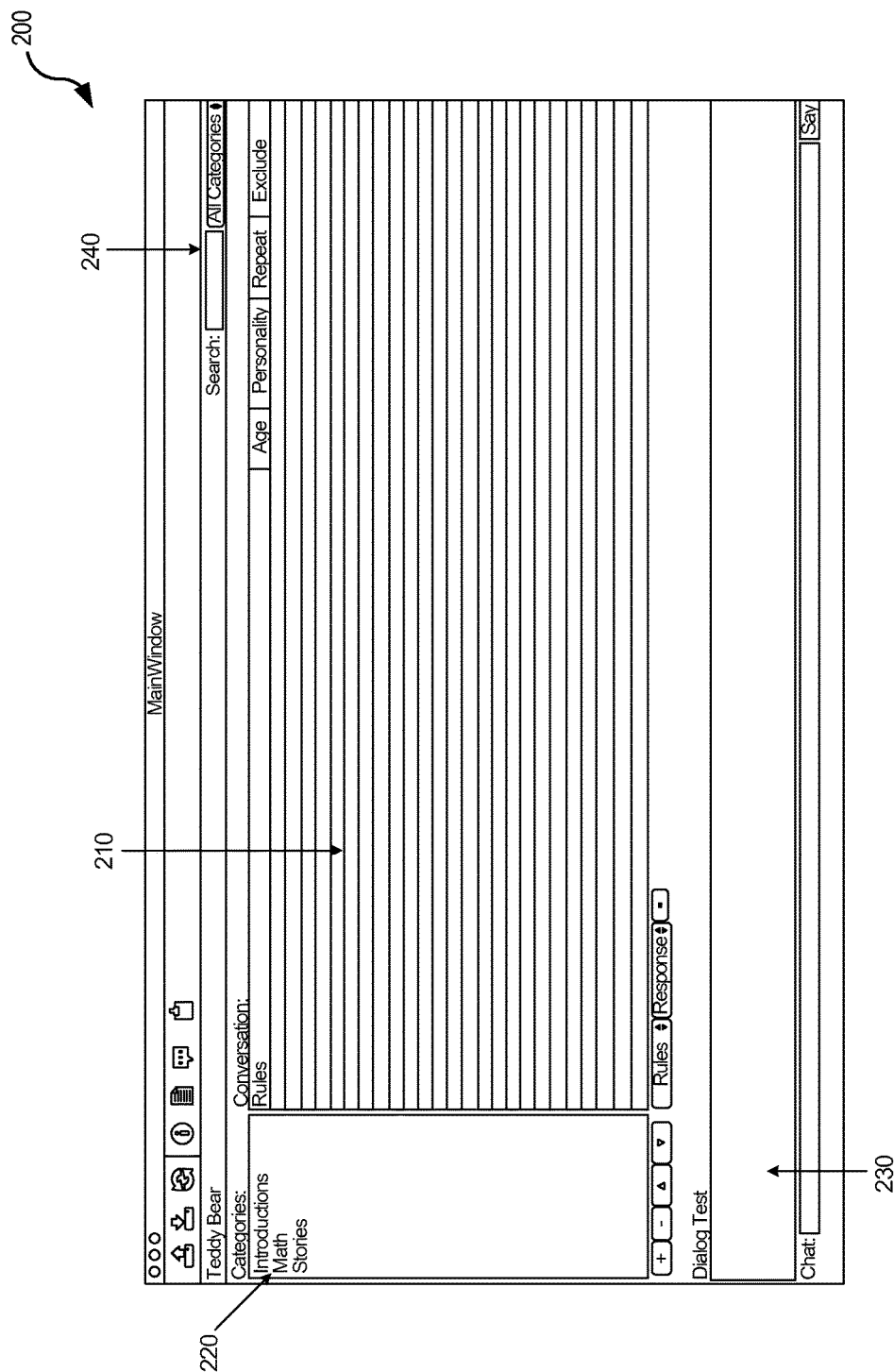
FIG. 2 is a screenshot of an exemplary script editor in accordance with one or more embodiments of the present invention.

FIG. 2 is a screenshot of an exemplary script editor 200 in accordance with one or more embodiments of the present invention. Script editor 200 may be a desktop application or a cloud computing application. Various embodiments of script editor 200 allow a user to visually craft the conversational content for a suite of characters. To this end the application can include one or more of the following functionalities: 1) deep topic-based conversations (support for nested rules and responses, or rejoinders); 2) flexible rules for matching a range of user inputs (e.g., "I love you" matches "hey I really love you man"); 3) differentiation between user questions and statements; 4) handle negatives in rules, so "I love you" doesn't match "I don't love you" (e.g., exclude "don't"); 5) support age-specific dialogs; 6) support different toy personalities (e.g., an emotional model, a pirate model, a sports model, etc); 7) handle repetition (i.e., the user repeating the same thing again); 8) support for fallback topics that attempt to recapture control of the conversation, or directed storytelling; 9) support for synonyms or concepts, i.e., "meat" also matches "chicken," "beef," or "pork"; 10) support for time-based rules that allow a toy's character to evolve over usage time; 11) support for specifying responses to physical gestures as the user moves the toy; 12) support for triggering animations or sound effects; 13) management for all phrases that need to be recorded by a voice talent; and/or 14) version control, including storing the content in an offsite database.

As illustrated in the embodiments shown in FIG. 2, a main window in script editor 200 can include a conversation rule editor 210, a category list 220, and a chat window 230. Conversation rule editor 210 allows a user to create all of the conversation rules and responses for a currently selected category. Conversation rule editor 210 enables the user to enter rules to match things the user says, followed by potential responses the AI system or character can offer. Each of these responses can include follow-up rules and responses in order to continue the conversation. The rules are shown in a hierarchical view to represent the various strands of conversation that can be scripted off of a single topic.

Category list 220 allows all of the content for a single character to be split across any number of categories, such as introductions, games, stories, math, etc. Chat window 230 allows the user to test out the latest content by typing words and seeing how the toy would respond with the given conversation rules. Various buttons can be used to quickly create the content. In addition, search box 240 can be used to search across some or all of the categories to find specific interactions. Script editor 200 may not be used to script all content. For example, in some embodiments, some content can be scripted directly using an underlying storage format, such as XML.

Figure 3:
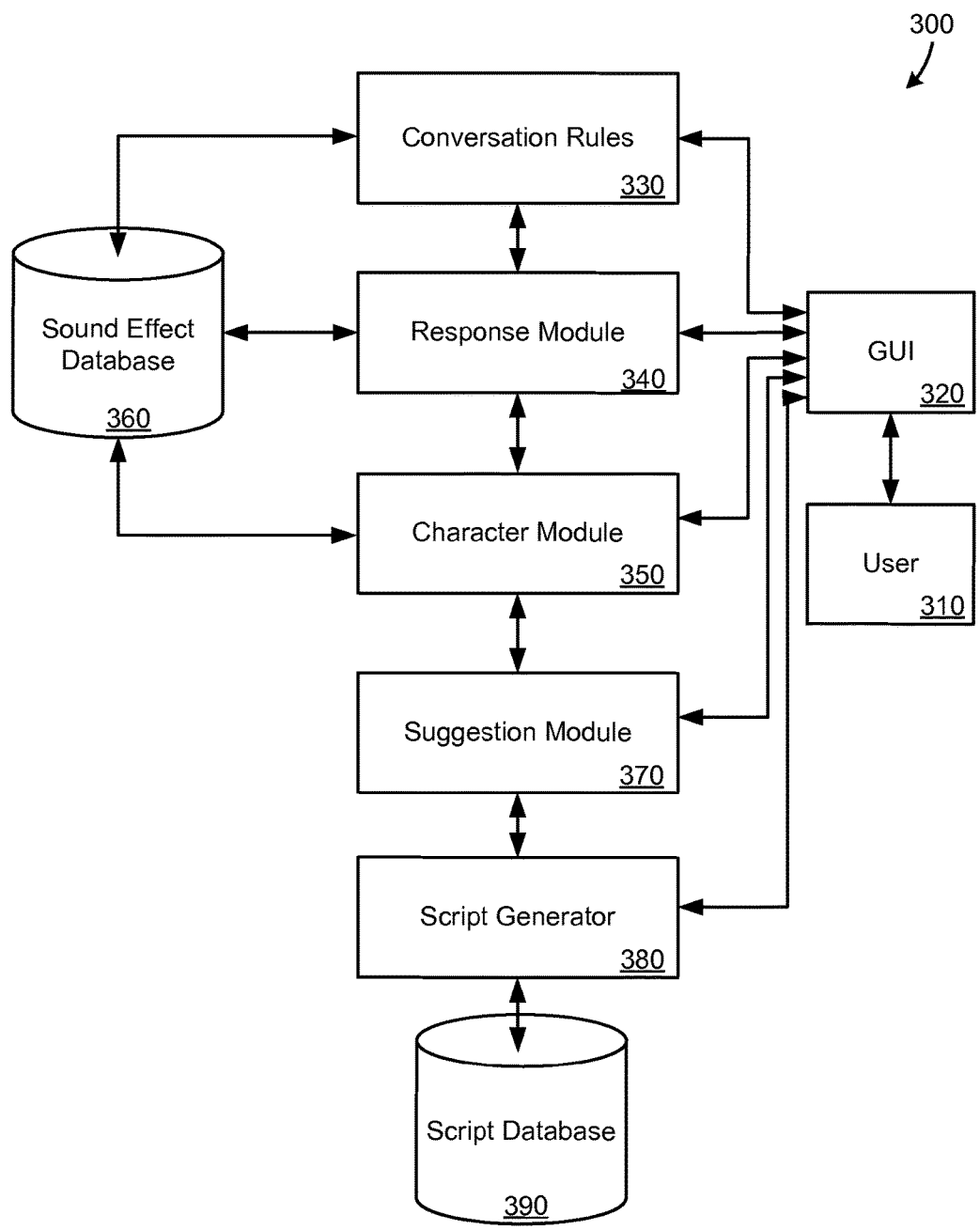
FIG. 3 is a block diagram illustrating exemplary components for an artificial intelligence script writing tool in accordance with various embodiments of the present invention.

FIG. 3 is a block diagram 300 illustrating exemplary components for an artificial intelligence script writing tool in accordance with various embodiments of the present invention. As illustrated in FIG. 3, user 310 (e.g., an engineer, script writer, novelist, author, or artist) can access the AI scripting tool through a graphical user interface 320. The scripting tool can have access to various features that allow for the user to more easily create the content. Conversation rule module 330 and a response module 340 can allow the user of the script tool to create customized conversation rules or to select from a set of pre-programmed rules. For example, a conversation rule module 330 and a response module 340 can be used to allow the user of the scripting tool to create one or more actions in the synthetic character in response to a set of conditions, responses, or inputs that have been detected.

In some embodiments, character module 350 can provide a guide to the user of the scripting tool in creating different types of characters or specific content. For example, if the user is creating a pirate themed character, character module 350 can provide templates or guides regarding the conversation style, flow, and direction. In some cases, one or more sound effects (e.g., media clips, recorded phrases, etc.) can be retrieved from sound effect database 360. This can be used to provide examples to the user of the types of content that can be created. In addition, the user of the scripting tool may be able to reuse media clips that have already been created. For educational characters, a specific set of educational content may be needed or required (e.g., by a third party) to be included content for the synthetic character. Graphical user interface 320 can also provide a visual indication of which content has been included and which content still needs to be included.

Suggestion module 370 can provide a suggested conversational rule to the user of the scripting tool through the graphical user interface 320. Suggestion module 370 can have input from character module 350 or include any content already created in the scripting tool (e.g., one or more of the previous conversation rules). Suggestions can also be derived from mining the data of previous user interactions with the AI system. In addition, in some cases, the scripting tool can allow for the user to provide an outline for the content flow or specific content points within a conversation. These can also be supplied as inputs to suggestion module 370. Using one or more of these inputs or information, suggestion module 370 can generate a suggested conversational rule or template which can be presented to the user of the scripting tool. The user may ignore, select, or edit the suggested conversational rule or template.

Once the user has completed generating the conversation rules, script generator 380 can convert the rules into a script that can be followed by a synthetic character. These scripts can be stored in script database 390. The scripts created by script generator 380 can have multiple states which associated responses. A set of conditions or navigational directives are associated with each state. In order to transition or navigate from one state to another, the navigational directives must be satisfied. Script generator 380 can provide for various consistency checks. For example, script generator 380 can check that no state within the script is isolated from the others (i.e., it will never be reached during use of the script). If this occurs, it can be flagged to the user 310 of the scripting tool.

Figure 4:
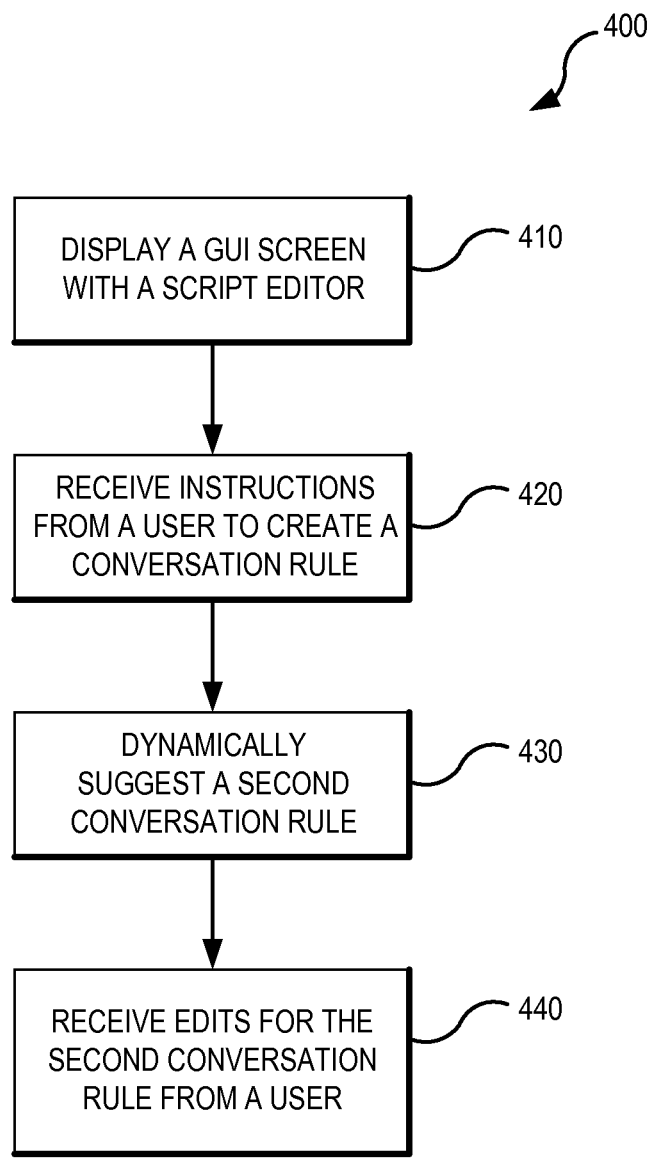
FIG. 4 is a flow chart illustrating an exemplary set of operations for creating an interactive experience in accordance with some embodiments of the present invention.

FIG. 4 is a flow chart illustrating an exemplary set of operations 400 for creating an interactive experience in accordance with some embodiments of the present invention. The operations illustrated in FIG. 4 can be performed by one or more hardware components, processors, engines, or modules disclosed herein. For example, one or more of the operations may be performed by suggestion module 370.

During display operation 410, a graphical user interface screen with a script editor can be displayed on a display device. Instructions are received from a user to create a conversation rule during receiving operation 420. Upon receiving the rule, a second rule can be dynamically suggested during suggestion operation 430. Many different factors and/or inputs may be used in determining the conversational rule to be suggested. Examples include, but are not limited to, age range of a user of the synthetic character, character type, content type, previous conversation rules, capabilities of the synthetic character, specific content points, content requirements, inputs collected from earlier user interactions with the AI system, and/or other inputs or factors. During editing operation 440, the user can edit the conversation rule as desired.

Figure 5:
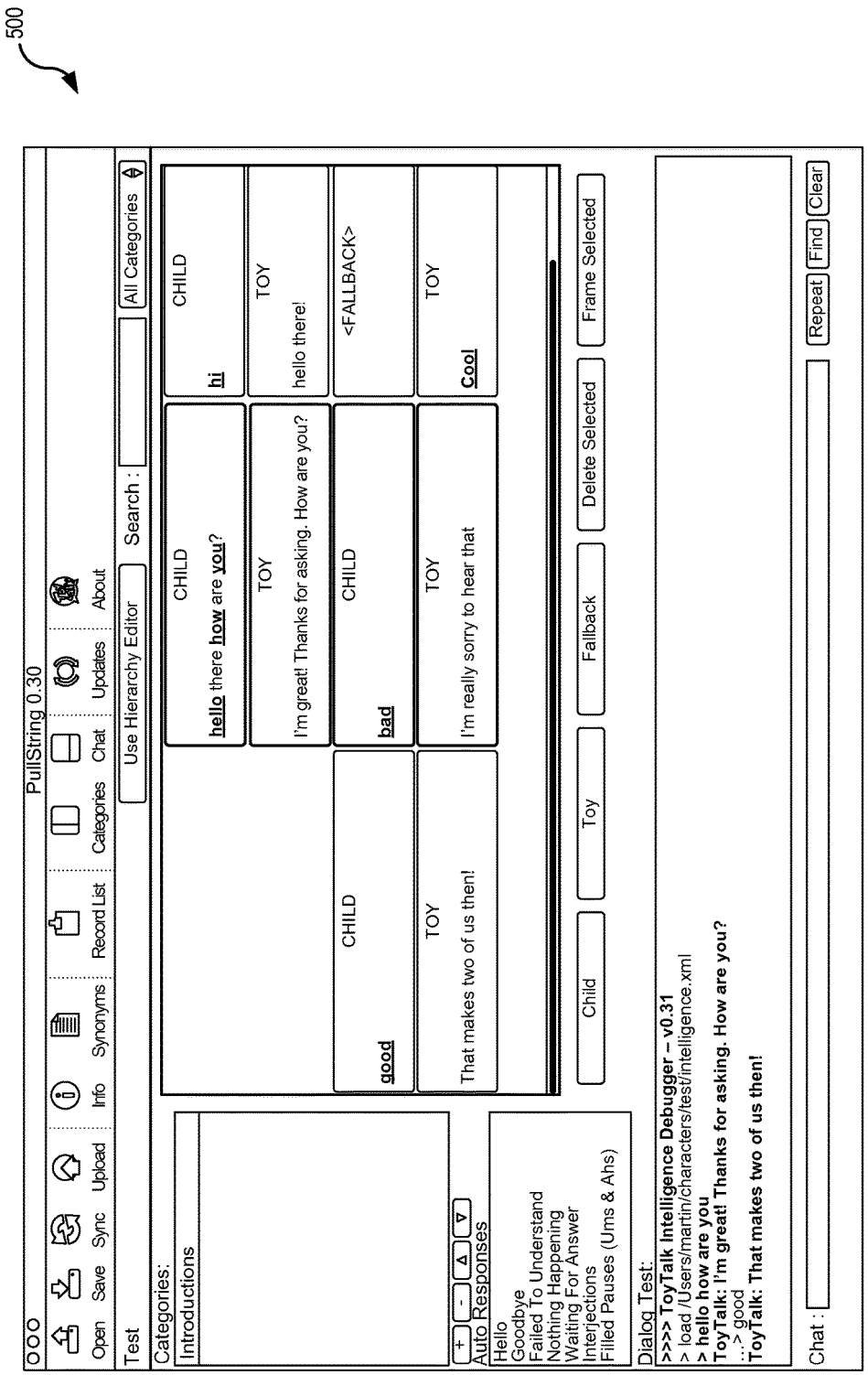
FIG. 5 is a screenshot of an exemplary script editor for creating dialog in accordance with one or more embodiments of the present invention.

FIG. 5 is a screenshot of an exemplary script editor 500 for creating dialog in accordance with one or more embodiments of the present invention. As illustrated in FIG. 5, the script editor 500 includes a conversation rule editor that offers a number of columns to customize how rules are matched or when responses may be used. In the embodiments illustrated in FIG. 5, script editor 500 provides a visual and interactive mechanism for creating the content. There is a top-down display of dialog from the top of the screen down through each of the conversation threads. At each vertical level we show all the options available, i.e., the different tracks that the conversation could take.

In this example, the user has selected the line "I'm really sorry to hear that" (in the fourth row), and the system shows (e.g., highlights, colors, or otherwise emphasizes) all of the dialog entries that would take the user to that statement. One of the advantages of this tool is that the tool can make a linear-looking script from top to bottom of the screen, and slide dialog boxes left and right to let the user chose different tracks down the hierarchical conversation. It may also align all of the rules and responses along that path such that they are stacked vertically on top of each other.

Figure 6:
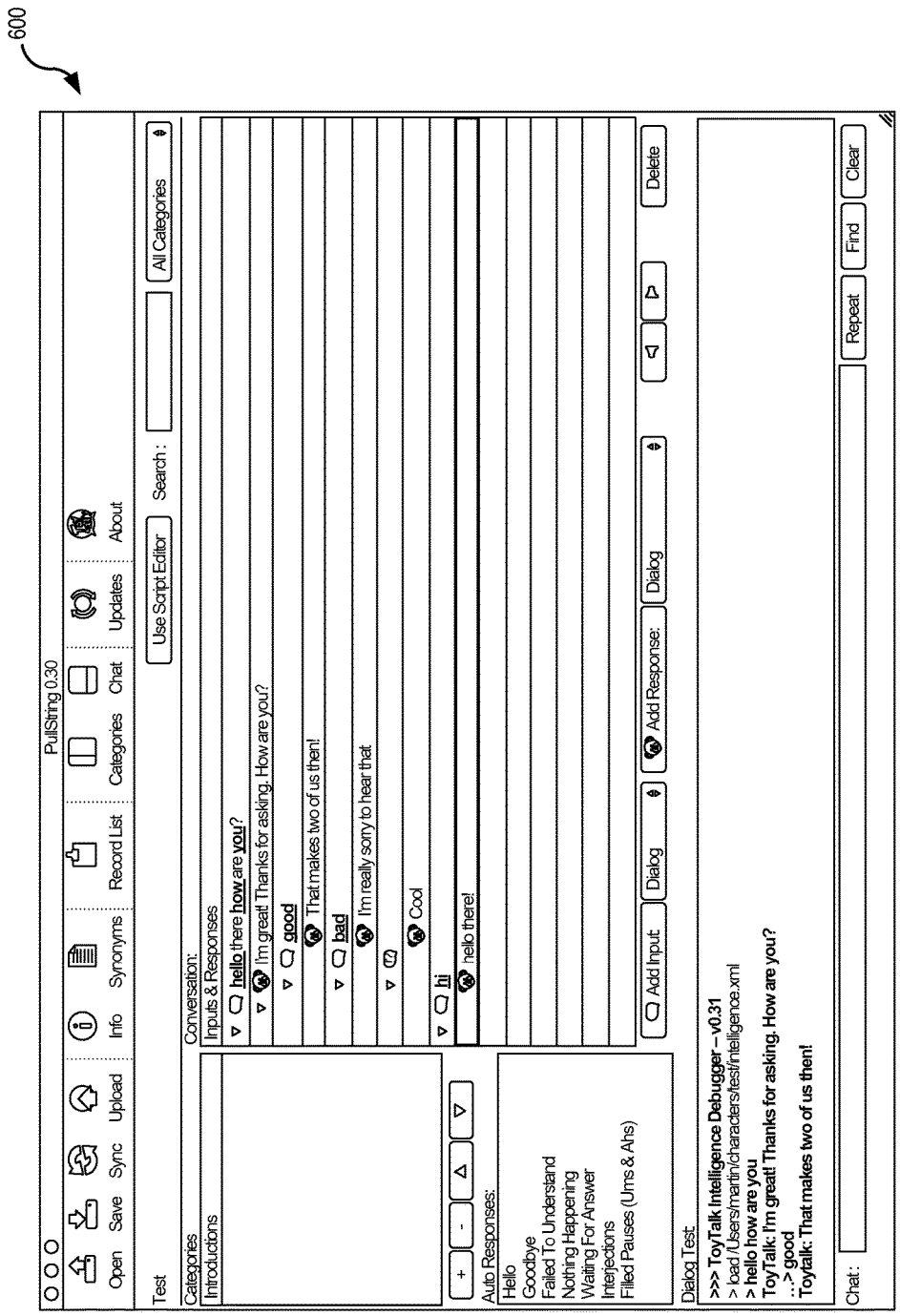
FIG. 6 is a screenshot of an exemplary tree editor in accordance with various embodiments of the present invention.

FIG. 6 is a screenshot of an exemplary tree editor 600 in accordance with various embodiments of the present invention. Various embodiments of the scripting tool can include tree editor 600 that provides a "tree" view of a hierarchical conversation. For example, the editor can allow for multiple inputs such as the user saying "Hello, how are you?" and "hi." Depending on the input, different responses can be created. For example, in the case of "hi" a response of "hello there!" may be used. In the case of "Hello, how are you?" a more elaborate conversation can be created by asking the user how they are and then recognize various responses such as "good," "bad," or a fallback response that will match anything else (to give some kind of response in the cases when we don't understand what the user said).

In some embodiments, key words can be selected from the phrases supplied. The synthetic character generated by the AI systems can then look for these key words in what the user says. This type of key word selection allows the creative writers to write out actual phrases and then just specify the key words that are used for the pattern recognition and ignore or deemphasize the remaining words. For example, if only the words "love" and "you" are emphasized, then the system will recognize any phrase from the user that uses those words in that order, such as "oh hi there I really love all that you are." This offers a useful technique to allow the creative user to specify pattern matching for an AI system.

Figure 7:
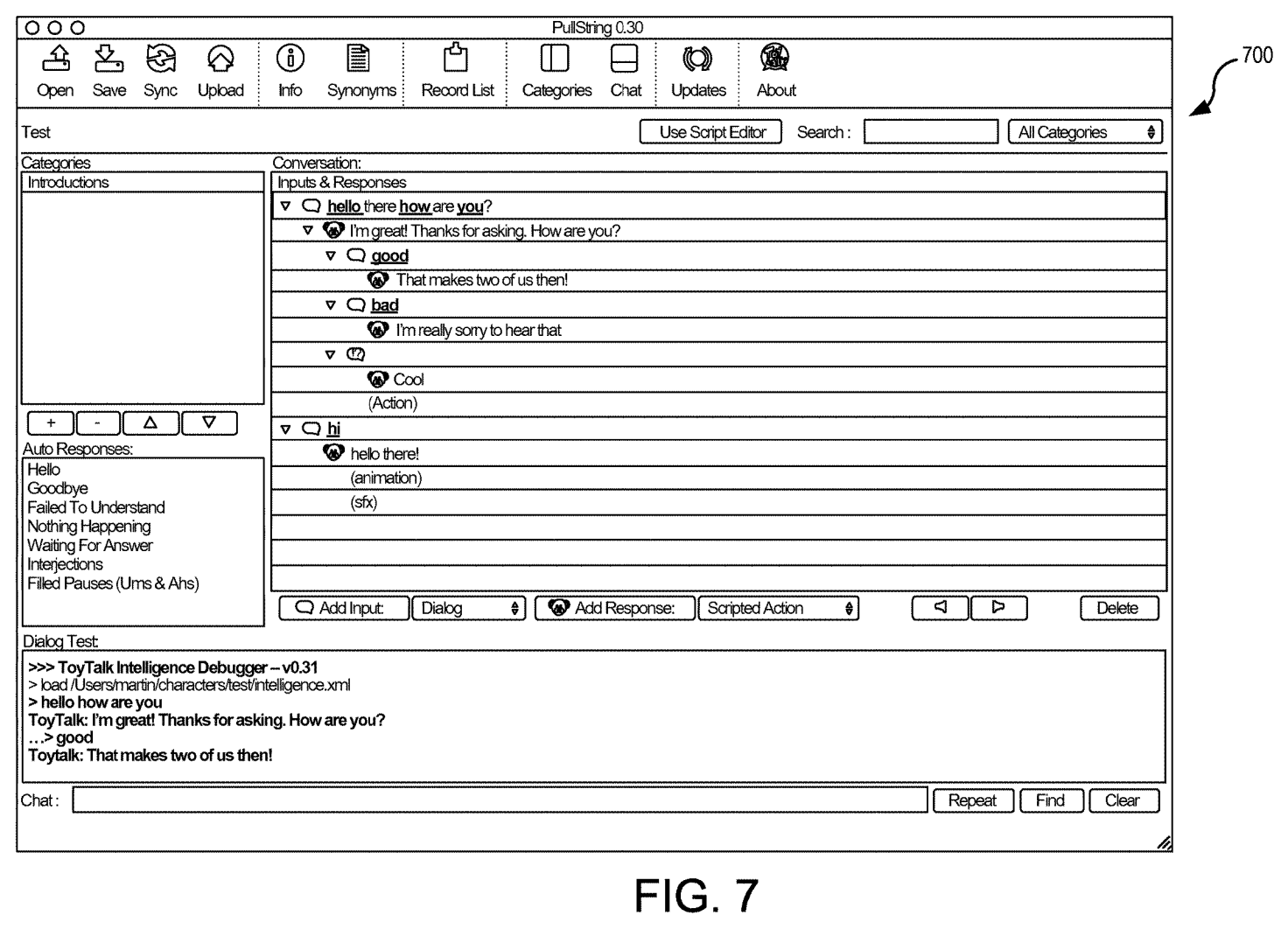

FIG. 7 is a screenshot of an exemplary tree editor tool 700 creating an animated dialog in accordance with some embodiments of the present invention. The tree editor tool 700 illustrated in FIG. 7 show some additional lines for performing an action in the application, playing an animation on the screen, or playing a sound sample. As such, various embodiments of the present invention allow for all types of content to be scripted and in many cases the content can include not only dialog, but an entire multimedia experience.

Figure 8:
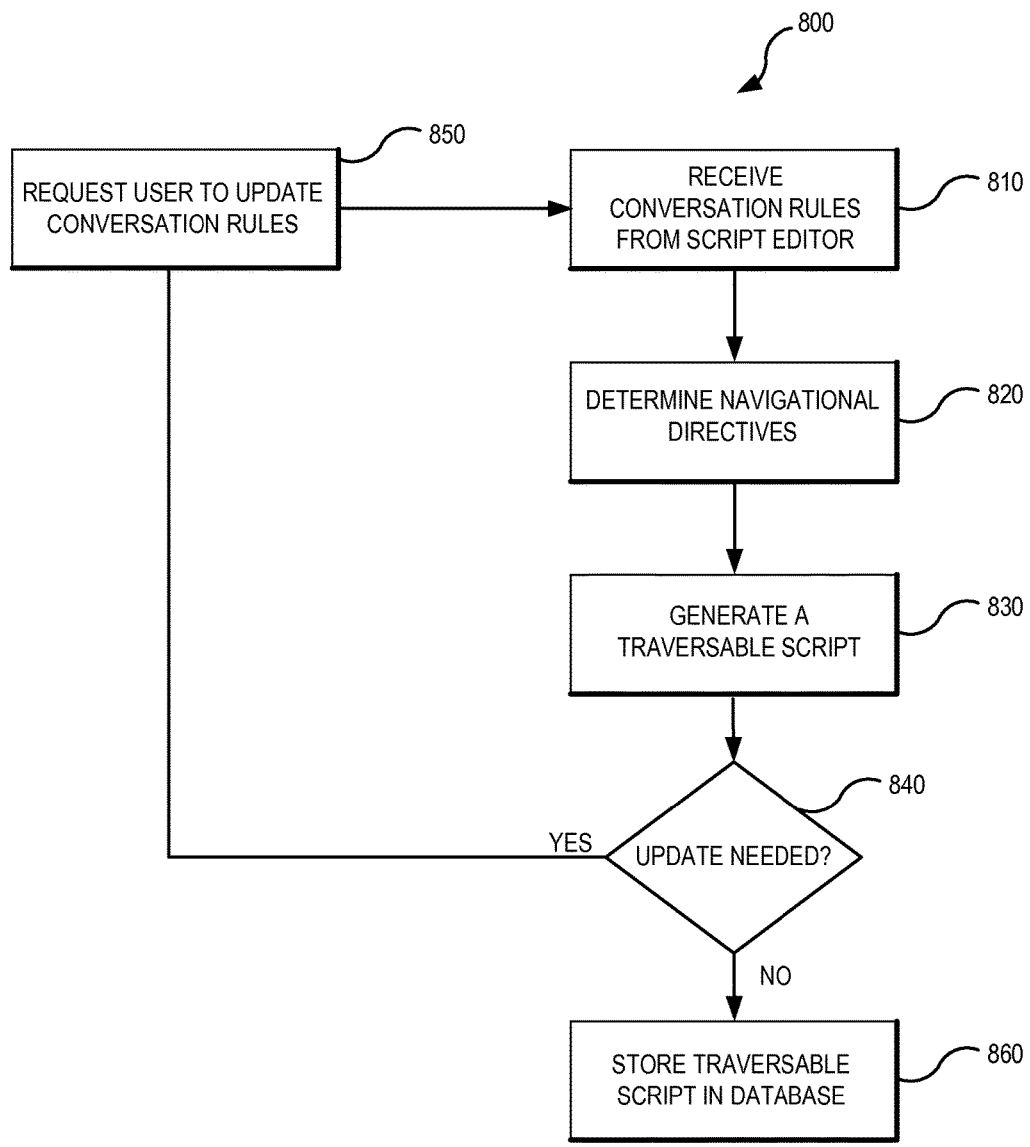
FIG. 8 is a flow chart illustrating an exemplary set of operations for generating a traversable script in accordance with some embodiments of the present invention.

FIG. 8 is a flowchart illustrating an exemplary set of operations 800 for generating a traversable script in accordance with some embodiments of the present invention. One or more of these operations for generating a traversable script may be performed by a processor, module, and/or component such as script generator 380. During receiving operation 810, a set of conversational rules are received from the user. The conversational rules define different states having responses (e.g., speech, play media clip, animate, etc.) and conditions (or navigational directives) for moving between the states.

Determination operation 820 determines the set of navigational directives. From these, a traversable script is generated during script generation operation 830. Determination operation 840 determines whether any updates are needed. For example, the script can be reviewed to determine if a set of required content has been included. In other cases, the script can be reviewed to ensure consistency with a specific character type or age group. Still yet, determination operation 850 can also determine if there are any problems with reaching one or more states within the script. If any updates are needed, then, determination operation 840 branches to request operation 850 where a request is generated for the user to update the conversational rules. If determination operation 840 determines that no update is needed, then determination operation 840 branches to storage operation 860 where the script is store in a database.

FIGS. 9A and 9B are screenshots of exemplary conversation editors creating an animated dialog in accordance with some embodiments of the present invention. As illustrated in these embodiments, the conversation rule editor can offer a number of columns to customize how rules are matched or when responses may be used. For example, the user can specify using a specific response for users of a certain age, or provide a response for a specific toy personality (mean, nice, obnoxious, etc.).

Figure 10A:
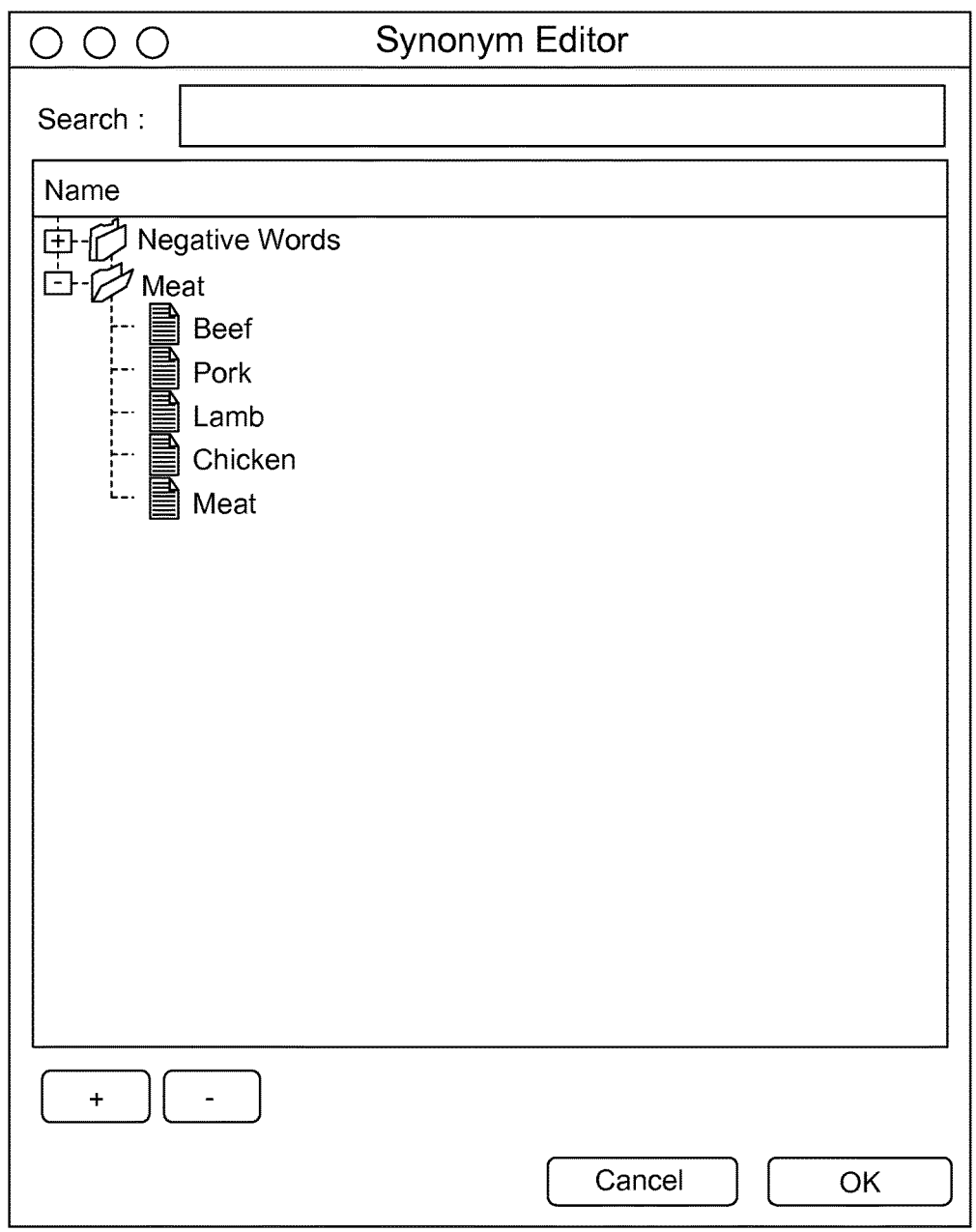
FIGS. 10A and 10B are screenshots of exemplary synonym and filler windows in accordance with some embodiments of the present invention.
Figure 10B:
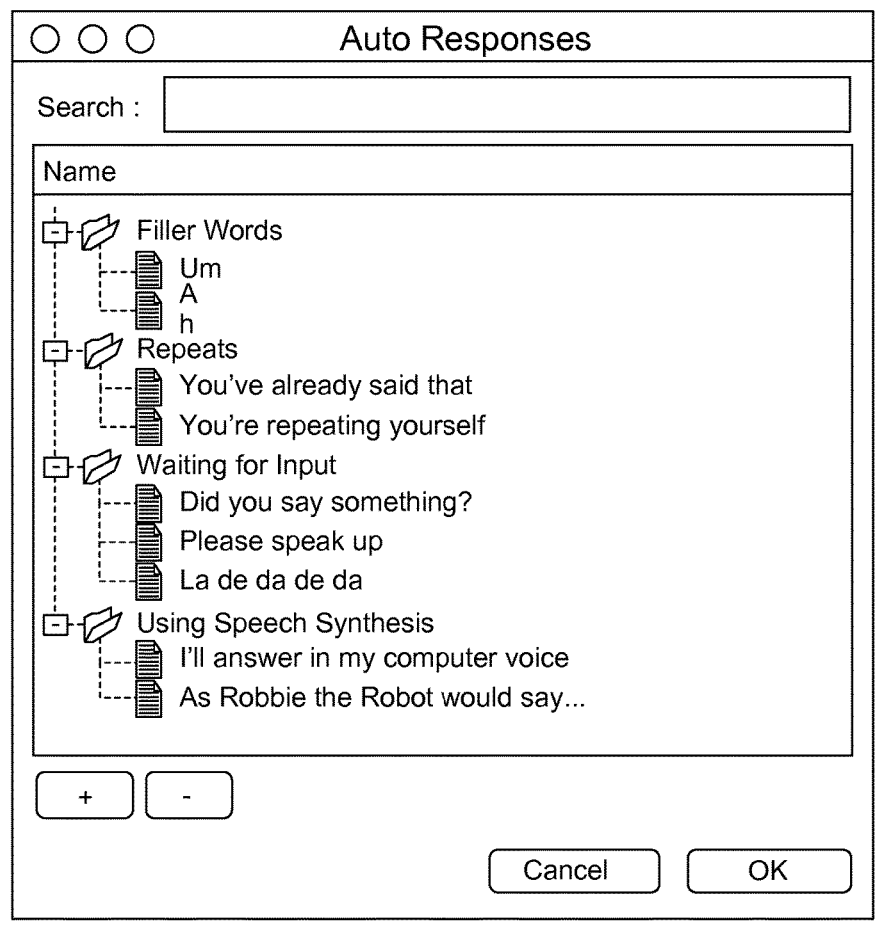

FIGS. 10A and 10B are screenshots of exemplary synonym and filler windows in accordance with some embodiments of the present invention. The synonyms window in FIG. 10A allows the user to specify all the synonyms (or concepts) for words that can be matched within rules. One advantage of this feature is that it allows the user to write a single rule that can match many different variations. Synonyms can be reused in every rule using a special character (e.g., ~). In the example illustrated the text "~meat" in a rule will also match "beef," "pork," "lamb," "chicken," as well as "meat" itself.

The conversation filler window allows the user to create various filler words or phrases that the synthetic character can use at its discretion to work around technical limitations like network lag, robotic speech synthesis, not hearing the user respond, etc. Some of the filler categories may be defined by the scripting tool and the user simply provides a set of possible things to say for each category. In other embodiments, customized categories may be created by the user.

Figure 11A:
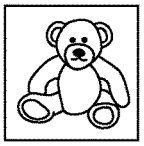

FIGS. 11A and 11B are screenshots of exemplary editors creating character metadata and managing recorded content in accordance with some embodiments of the present invention. FIG. 11A illustrates a character property editor that allows the user to specify various metadata describing the character. This editor can also be used to specify the default state for the synthetic character, such as its initial personality or the default age range that it will customize content for (until it knows the user's actual age).

FIG. 11B illustrates a pre-recorded content editor that can be used to manage pre-recorded audio content for all the things a synthetic character can say. The pre-recorded content editor may be able to search and find all of the responses that need to be recorded. In some embodiments, the pre-recorded content editor can display a record list of all the responses to be recorded, all those that have already been recorded, and a way to detect phrases that may be duplicates and that could be merged to reduce the number of recordings.

Additional functionality, perhaps in a different editor, may be used to simplify the process of recording content, cutting it into individual MP3 files, cropping, changing bit rate, and associating each file with the appropriate responses. In many cases, the various scripting tools described here may not be responsible for all the scripted dialog content. Other elements created outside of the scripting tools might include: 1) automatically generated rules, such as from a list of yes/no questions; 2) logic puzzles that require coding skills, such as math games or guess-the-number-I'm-thinking-of; and/or 3) games that involve tables of data that can be downloaded, such as knowing all the capitals of the world. The scripting tools, in accordance with one or more embodiments, may provide an interface for inserting, editing, or interfacing with outside content. In some embodiments, the scripting tools could provide access to the set of transcribed voice recordings that we gather from users, to suggest new topics of conversation.

Exemplary Computer System Overview

Figure 12:
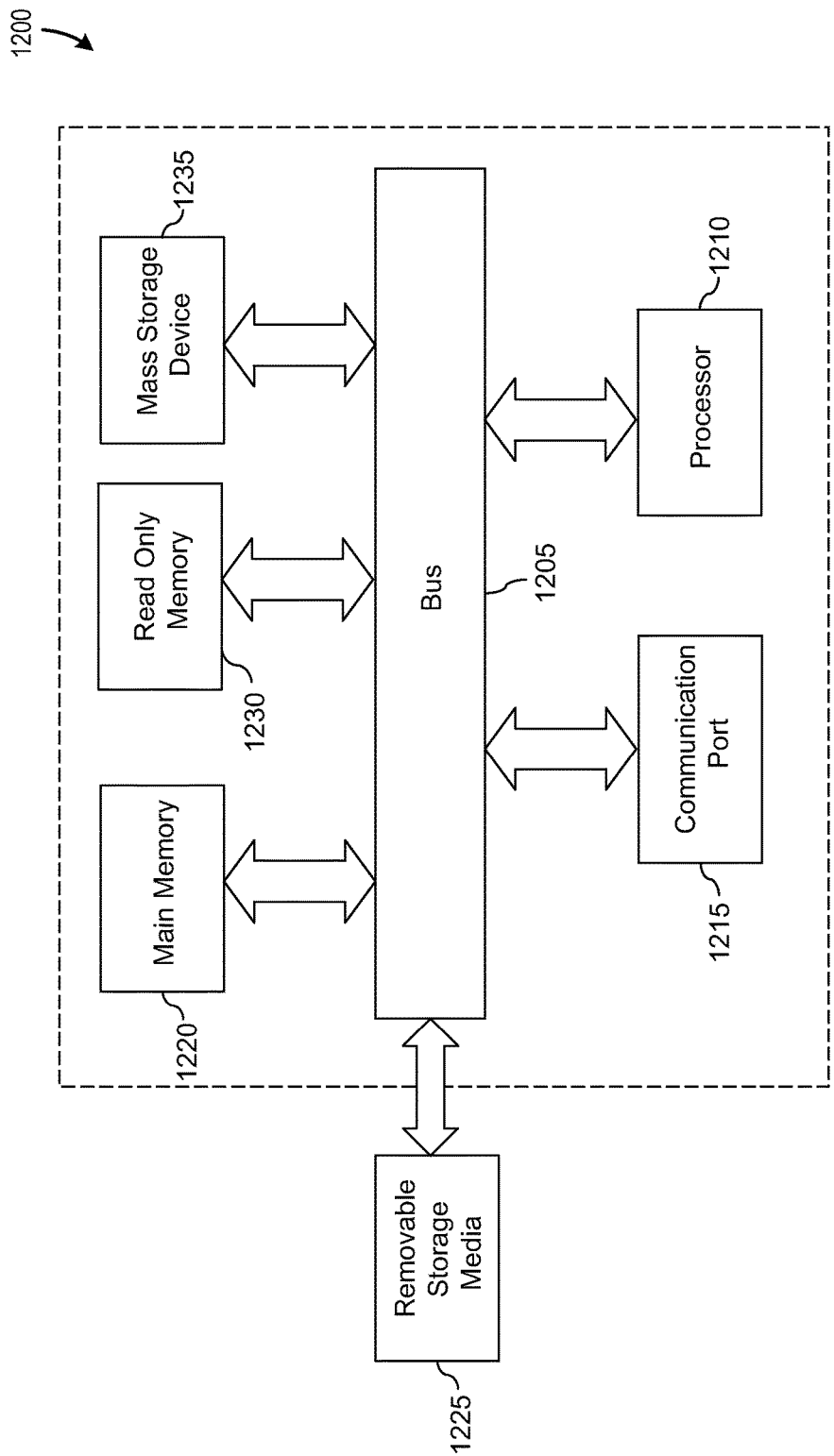
FIG. 12 illustrates an example of a computer system with which some embodiments of the present invention may be utilized.

Embodiments of the present invention include various steps and operations, which have been described above. A variety of these steps and operations may be performed by hardware components or may be embodied in machineexecutable instructions, which may be used to cause a general-purpose or special-purpose processor programmed with the instructions to perform the steps. Alternatively, the steps may be performed by a combination of hardware, software, and/or firmware. As such, FIG. 12 is an example of a computer system 1200 with which embodiments of the present invention may be utilized. According to the present example, the computer system includes a bus 1205, at least one processor 1210, at least one communication port 1215, a main memory 1220, a removable storage media 1225, a read only memory 1230, and a mass storage 1235.

Processor(s) 1210 can be any known processor, such as, but not limited to, an Intel® Itanium® or Itanium 2® processor(s), or AMD® Opteron® or Athlon MP® processor(s), or Motorola® lines of processors. Communication port(s) 1215 can be any of an RS-232 port for use with a modem-based dialup connection, a 10/100 Ethernet port, or a Gigabit port using copper or fiber. Communication port(s) 1215 may be chosen depending on a network such a Local Area Network (LAN), Wide Area Network (WAN), or any network to which the computer system 1200 connects.

Main memory 1220 can be Random Access Memory (RAM), or any other dynamic storage device(s) commonly known in the art. Read only memory 1230 can be any static storage device(s) such as Programmable Read Only Memory (PROM) chips for storing static information such as instructions for processor 1210.

Mass storage device 1235 can be used to store information and instructions. For example, hard disks such as the Adaptec® family of SCSI drives, an optical disc, an array of disks such as RAID, such as the Adaptec family of RAID drives, or any other mass storage devices may be used.

Bus 1205 communicatively couples processor(s) 1210 with the other memory, storage and communication blocks. Bus 1205 can be a PCI/PCI-X or SCSI based system bus depending on the storage devices used.

Removable storage media 1225 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods, and arrangements for creating customized interactive content for synthetic characters. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A system comprising:
a display device;
an input device; and
a memory that includes instructions for creating a customized script for a synthetic character,
wherein the instructions, when executed by a processor, cause the processor to:
present a graphical user interface comprising a plurality of columns on the display device,
wherein each column of the plurality of columns includes a graphical representation of a user input and a graphical representation of a synthetic character response corresponding to an alternate thread of a conversation,
wherein the user input and the synthetic character response in each column corresponds to a conversation rule for the synthetic character, the conversation rule indicating to the processor how the conversation will flow under certain conditions, and
wherein each column of the plurality of columns is presented horizontally in succession to visually illustrate alternate threads of the conversation;
receive an input indicative of user input provided via the input device; and
cause at least one column of the plurality of columns to be adjusted to reflect a customization to a conversation rule associated with the at least one column in response to the input.

2. The system of claim 1, wherein the conversation rule reflects an environmental stimulus, wherein the environmental stimulus includes data inputs, environment observations, or interactions with the synthetic character.

3. The system of claim 2, wherein the data inputs include current weather conditions gathered from a remote source, time of day, day of the week, location, age of a child, or previous patterns of interaction.

4. The system of claim 2, wherein the environment observations include a number of observed voices, current noise level, objects present, or detection of a second synthetic character.

5. The system of claim 1, wherein at least one synthetic character response includes a sound effect.

6. The system of claim 5, wherein the sound effect includes a voice-simulated reading of text within one of a set of customized responses, a media clip, or a live speaker.

7. The system of claim 1, wherein the instructions further cause the processor to:
permit text appearing in at least one of the graphical representations of the user inputs to be modified to reflect a key word that will be used for pattern recognition.

8. The system of claim 1, wherein at least one synthetic character response includes an animation.

9. A computer-implemented method for developing content for an interactive synthetic character, the method comprising:
causing display of a graphical user interface comprising a plurality of columns,
wherein each column of the plurality of columns includes a graphical representation of a user input and a graphical representation of a synthetic character response corresponding to an alternate thread of a conversation,
wherein the user input and the synthetic character response in each column corresponds to one or more conversation rules for the interactive synthetic character, and
wherein each column of the plurality of columns is presented horizontally in succession to visually illustrate alternate threads of the conversation;

receiving an input indicative of user input provided by an operator;

causing at least one column of the plurality of columns to be adjusted to reflect a customization to a conversation rule specified by the input, the conversation rule being associated with the at least one column; and dynamically adjusting a column of the plurality of columns to reflect an additional conversation rule based upon the input.

10. The computer-implemented method of claim 9, wherein the additional conversation rule includes a response to be performed by the interactive synthetic character.

11. The computer-implemented method of claim 9, wherein at least one conversation rule of the one or more conversation rules includes an age association.

12. The computer-implemented method of claim 9, wherein at least one conversation rule of the one or more conversation rules includes an environmental stimulus.

13. The computer-implemented method of claim 12, wherein the environmental stimulus includes speech observed by the interactive synthetic character.

14. The computer-implemented method of claim 9, wherein at least one conversation rule of the one or more conversation rules includes a navigational directive indicating conditions upon which a state engine will move from one conversation rule to another conversation rule.

15. The computer-implemented method of claim 14, wherein the navigational directive includes a time-based conversation rule allowing the state engine to navigate to different conversation rules over time.

16. The computer-implemented method of claim 9, further comprising:

modifying, based on the input, at least one of the graphical representations of the user inputs to reflect a key word that will be used for pattern recognition.

17. The computer-implemented method of claim 9, wherein the graphical user interface includes a simulator input allowing the operator to navigate conversation content created for the interactive synthetic character.

18. A computer-implemented method comprising:

displaying a conversation editor configured to create a traversable script for an interactive synthetic character;

causing the conversation editor to present a graphical user interface comprising a plurality of columns, each of the plurality of columns depicting one or more graphical representations of user inputs and one or more graphical representations of synthetic character responses in an alternate thread of a conversation, the user inputs and synthetic character responses in each column corresponding to one or more conversation rules for the interactive synthetic character, each column of the plurality of columns presented horizontally in succession to visually illustrate alternate threads of the conversation;

receiving a set of conversation rules from a user, wherein each conversation rule includes one or more responses to be performed by the interactive synthetic character;

generating the traversable script from the set of conversation rules, wherein the traversable script can be navigated by a state engine; and storing the traversable script in a database.

19. The method of claim 18, wherein the set of conversation rules includes multi-way communications between more than one interacting entity.

20. The method of claim 18, further comprising associating a navigational directive with each conversation rule indicating conditions when the state engine will transition to another conversation rule.

21. The method of claim 18, further comprising determining when one or more responses include phrases to be recorded by a voice talent.

22. The method of claim 18, further comprising associating a category with the traversable script.

23. The method of claim 18, further comprising associating an age range with each of the conversation rules or responses.

24. The method of claim 18, wherein the one or more responses to be performed by the interactive synthetic character include producing audible or textual speech for the interactive synthetic character, performing one or more animations, or playing one or more sound effects.

25. A non-transitory computer-readable medium comprising instructions configured to cause a computer system to perform a method comprising:

displaying, on a display device, a graphical user interface comprising a plurality of columns,
wherein each column of the plurality of columns includes one or more graphical representations of user inputs and one or more graphical representations of synthetic character responses in an alternate thread of a conversation,
wherein the user inputs and synthetic character responses in each column correspond to one or more conversation rules for a synthetic character, and
wherein each column of the plurality of columns is presented horizontally in succession to visually illustrate alternate threads of the conversation;

receiving, from an operator of the computer system, an input;

causing at least one column of the plurality of columns to be adjusted to reflect a customization to a conversation rule associated with the at least one column in response to the input; and dynamically adjusting a column of the plurality of columns to reflect an additional conversation rule based upon the input.

26. The non-transitory computer-readable medium of claim 25, wherein at least one conversation rule of the conversation rules reflects an environmental stimulus, wherein the environmental stimulus includes data inputs, environment observations, or interactions with the synthetic character.

27. The non-transitory computer-readable medium of claim 26, wherein the data inputs include current weather conditions gathered from a remote source, time of day, day of the week, location, age of a child, or previous patterns of interaction.

28. The non-transitory computer-readable medium of claim 26, wherein the environment observations include a number of observed voices, current noise level, objects present, or detection of a second interactive synthetic character.

29. The non-transitory computer-readable medium of claim 25, wherein at least one synthetic character response includes a sound effect.

30. The non-transitory computer-readable medium of claim 29, wherein the sound effect includes a voice-simulated reading of text within one of the set of customized responses, a media clip, or a live speaker.

31. The non-transitory computer-readable medium of claim 25, wherein the method further comprises:

permitting text appearing in at least one of the graphical representations of the user inputs to be modified to reflect a key word that will be used for pattern recognition.

32. The non-transitory computer-readable medium of claim 25, wherein at least one synthetic character response includes an animation.

33. The non-transitory computer-readable medium of claim 25, wherein each of the plurality of columns represents a potential linear conversational exchange between a user and the synthetic character.

34. A system comprising:
a display device;
an input device; and
a memory that includes instructions for creating a traversable script for an interactive synthetic character,
wherein the instructions, when executed by a processor, cause the processor to:
present a graphical user interface comprising
a plurality of columns on the display device,
wherein each column of the plurality of columns includes one or more graphical representations of user inputs and one or more graphical representations of synthetic character responses, the user inputs being vocalizations made by a user and the synthetic character responses being vocalizations, animations, or both made by the interactive synthetic character,
wherein each of the plurality of columns represents a distinct an alternate thread of a conversation,
wherein the synthetic character responses in each column are chosen in accordance with one or more conversation rules for the interactive synthetic character, and
wherein each column of the plurality of columns is presented horizontally in succession to visually illustrate alternate threads of the conversation;
recognize a keyword within at least one user input,
wherein the keyword is used to identify an appropriate synthetic character response for the at least one user input;
visually distinguish the keyword from other words in the at least one user input;
receive an input via the input device that modifies one of the one or more conversation rules; and
cause at least one of the synthetic character responses in one of the plurality of columns to be dynamically adjusted to reflect the modification of the conversation rule.

\* \* \* \* \*

UNITED STATES PATENT AND TRADEMARK OFFICE
CERTIFICATE OF CORRECTION

| | | |
|---|---|---|
| PATENT NO. | : 10,223,636 B2 | Page 1 of 1 |
| APPLICATION NO. | : 13/558206 | |
| DATED | : March 5, 2019 | |
| INVENTOR(S) | : Martin Reddy et al. | |

It is certified that error appears in the above-identified patent and that said Letters Patent is hereby corrected as shown below:

In the Claims

In Column 16, Line 5, Claim 34, delete "a distinct".

Signed and Sealed this
Twenty-seventh Day of May, 2025

Coke Morgan Stewart
*Acting Director of the United States Patent and Trademark Office*